United States Patent [19]

Schiffman et al.

[11] 4,063,046
[45] Dec. 13, 1977

[54] TELEPHONE MOUNTED CALCULATOR

[75] Inventors: Jerome D. Schiffman, Wilmette; Bernard L. Kleinke, Des Plaines, both of Ill.

[73] Assignees: Jerome D. Schiffman; Milton Shlaes, both of Chicago, Ill.

[21] Appl. No.: 648,124

[22] Filed: Jan. 12, 1976

Related U.S. Application Data

[63] Continuation-in-part of Ser. No. 508,768, Sept. 24, 1974, Pat. No. 4,002,855.

[51] Int. Cl.$^2$ ............................................. H04M 1/21
[52] U.S. Cl. ............................ 179/90 K; 179/90 AN; 179/2 DP; 364/705; 364/708
[58] Field of Search ............ 179/90 K, 90 R, 90 AT, 179/90 B, 90 AN, 2 DP, 81 R, 90; 200/340, 159 R, 5 E, 333, 340, 302, 304; 40/336; 197/102; 235/151, 156

[56] References Cited

U.S. PATENT DOCUMENTS

| | | | |
|---|---|---|---|
| 3,739,105 | 6/1973 | Anson | 179/90 K |
| 3,760,121 | 9/1973 | Nissim | 179/90 K |
| 3,778,553 | 12/1973 | Rackman | 179/2 DP |
| 3,920,926 | 11/1975 | Lenaerts et al. | 179/90 AN |
| 3,932,709 | 1/1976 | Hoff et al. | 179/90 K |

*Primary Examiner*—Kathleen H. Claffy
*Assistant Examiner*—Gerald L. Brigance
*Attorney, Agent, or Firm*—Bernard L. Kleinke

[57] ABSTRACT

A calculator adapted to be used with a push button telephone having an array of telephone push buttons for serving both as a calculator and as an enlarger for the push buttons to facilitate the actuation of them, includes a first array of finger discs corresponding to at least some of the telephone push buttons and extending from a cup-shaped housing having an open mouth adapted to fit over the array of telephone push buttons, the first array of finger discs enabling the user to actuate the telephone push buttons. Logic circuits are mounted within the housing for performing mathematical calculations, and a display device mounted on the housing responds to the logic circuits for indicating information concerning the calculations. A first set of switches are mounted on the housing and respond to the finger discs for causing the generation of input information for the logic circuits. A second array of finger discs bear calculating indicia on their front faces and, when depressed by the user, close a second set of switches for causing additional input information to be generated for the logic circuits.

10 Claims, 6 Drawing Figures

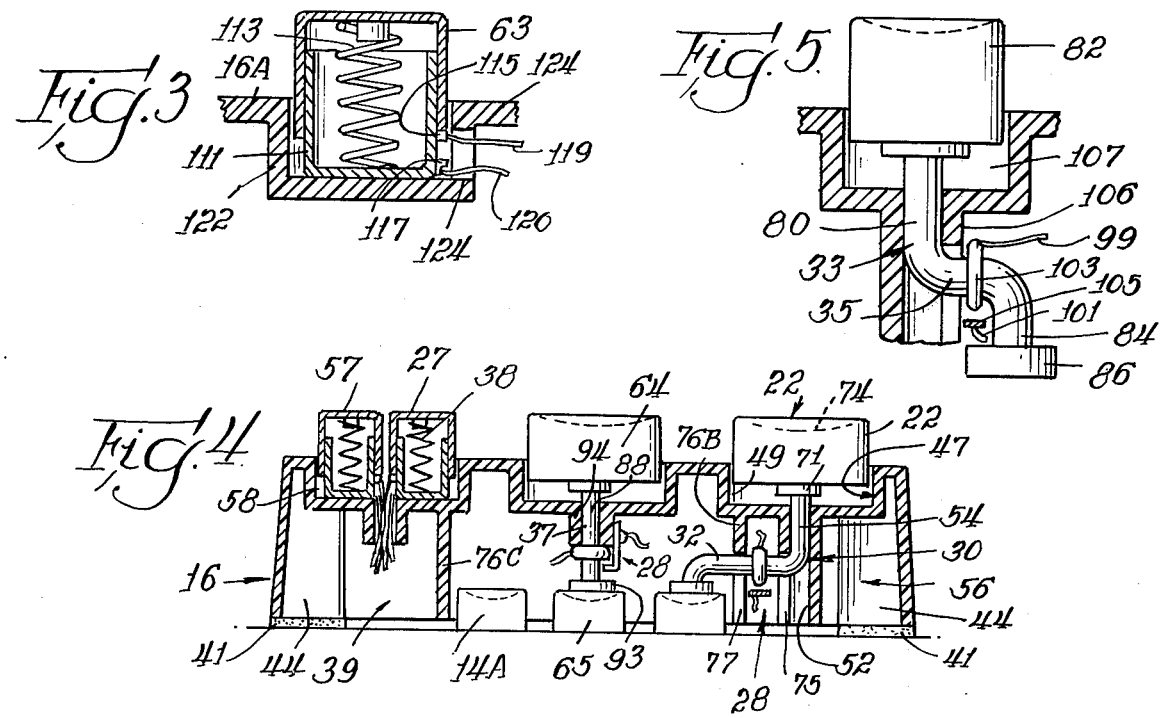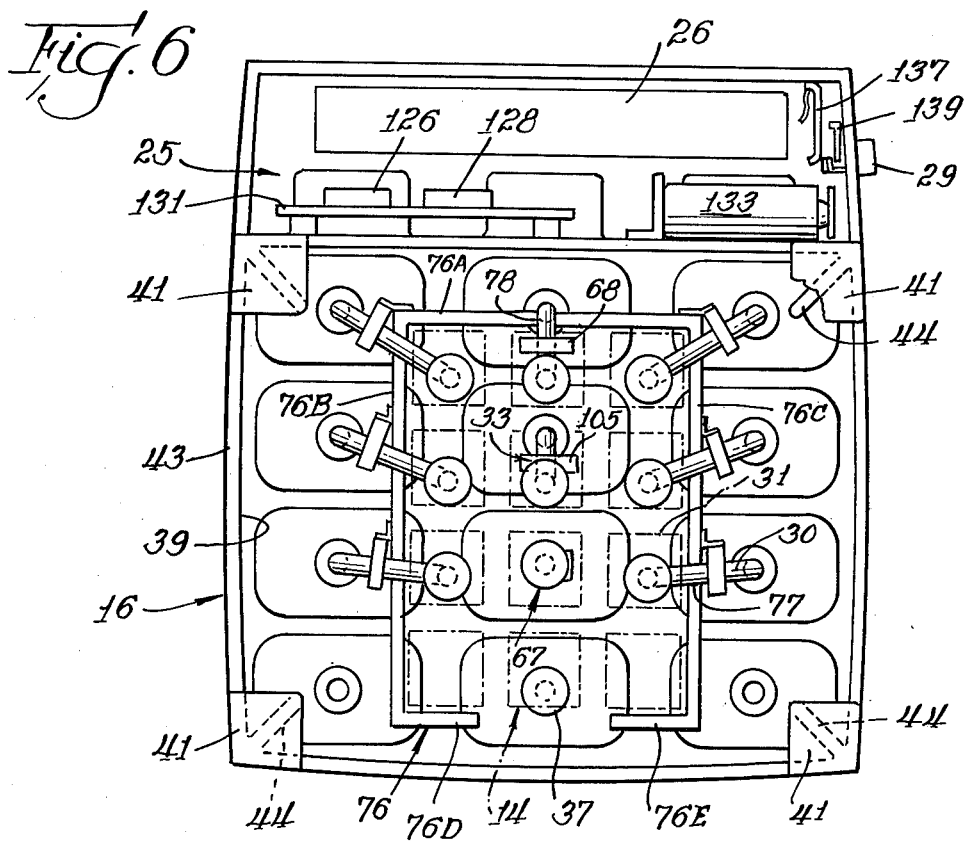

TELEPHONE MOUNTED CALCULATOR

This patent application is a continuation-in-part patent application of co-pending United States patent application, Ser. No. 508,768, filed Sept. 24, 1974, now U.S. Pat. No. 4,002,855.

The present invention relates in general to a telephone mounted calculator, and it more particularly relates to a calculator which is adapted to be attached to and used with a push button telephone.

With the advent of sophisticated electronic circuits, electronic calculators are becoming increasingly more popular and are usually either the hand-held type or the desk type. Such calculators are used both in the home and for business purposes. When such calculators are either used in the home or for business purposes, the hand-held calculator is generally small in size and thus may be misplaced or lost, or it may not be readily located when it is desired to be used. While the desk-type calculator does not suffer from these same problems, the desk-type calculator does occupy valuable space on a desk, which space could otherwise be utilized for other purposes. Therefore, it would be highly desirable to have a small electronic calculator which can be attached to and used with a telephone which might already occupy space on a desk. Such a calculator would then not occupy any additional valuable space on a desk, and it would always be readily located. In addition, such a calculator could also be attached to a wall-mounted telephone, and therefore be readily available when needed.

Therefore, the principal object of the present invention is to provide a new and improved telephone mounted calculator for push button telephones, which calculator could be readily attached to the telephone and used in connection therewith.

Briefly, the above and further objects of the present invention are realized by providing a calculator having a first set of finger discs mounted on a cup-shaped housing having an opened mouth adapted to fit over an array of telephone push buttons, the first array of finger disc being adapted to actuate the telephone push buttons. Logic circuits are mounted within the housing for performing mathematical calculations, and the results of those calculations are displayed on a display device mounted on the housing and connected electrically to the logic circuits. A first set of switches respond to the finger discs for causing the generation of input information for the logic circuits, and a second array of finger discs bearing calculating indicia thereon cause the actuation of a second set of switches for causing additional input information to be generated for the logic circuits. The first array of finger discs serve as an enlarger to facilitate the location and manipulation of the telephone push buttons, thereby minimizing dialing errors. The first array of finger discs also serve to provide input information, such as input digits for calculations, for the logic circuits.

The above and further objects will best be understood by reference to the accompanying description and the drawings, wherein:

FIG. 3 is a cross-sectional view of the calculator of FIG. 2 taken substantially along the line 3—3 thereof;

FIG. 4 is a cross-sectional compound view of the calculator of FIG. 2, taken substantially along the line 4—4 thereof;

FIG. 5 is a cross-sectional view of the calculator of FIG. 2 taken substantially along the line 5—5 thereof; and FIG. 6 is a bottom enlarged plan view of the calculator of FIG. 1, showing the calculator apart from a telephone.

Figure 1:
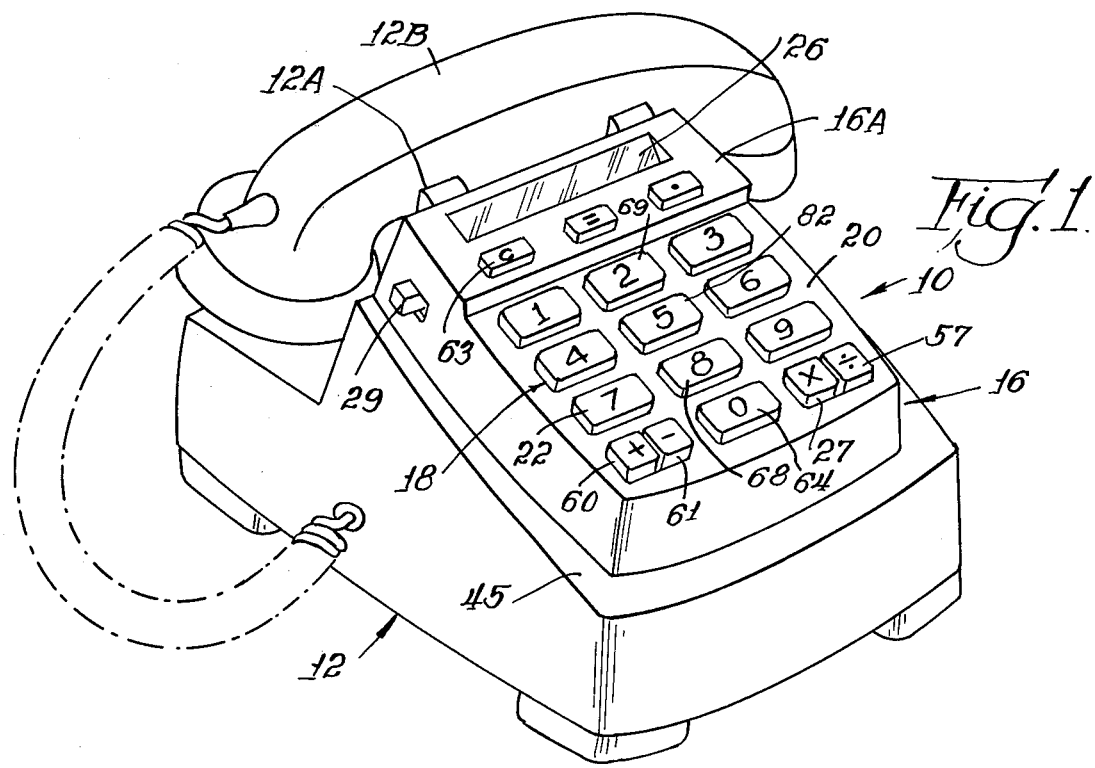
FIG. 1 is a pictorial view of the calculator mounted on a conventional push button telephone, the calculator being constructed in accordance with the present invention.
Figure 2:
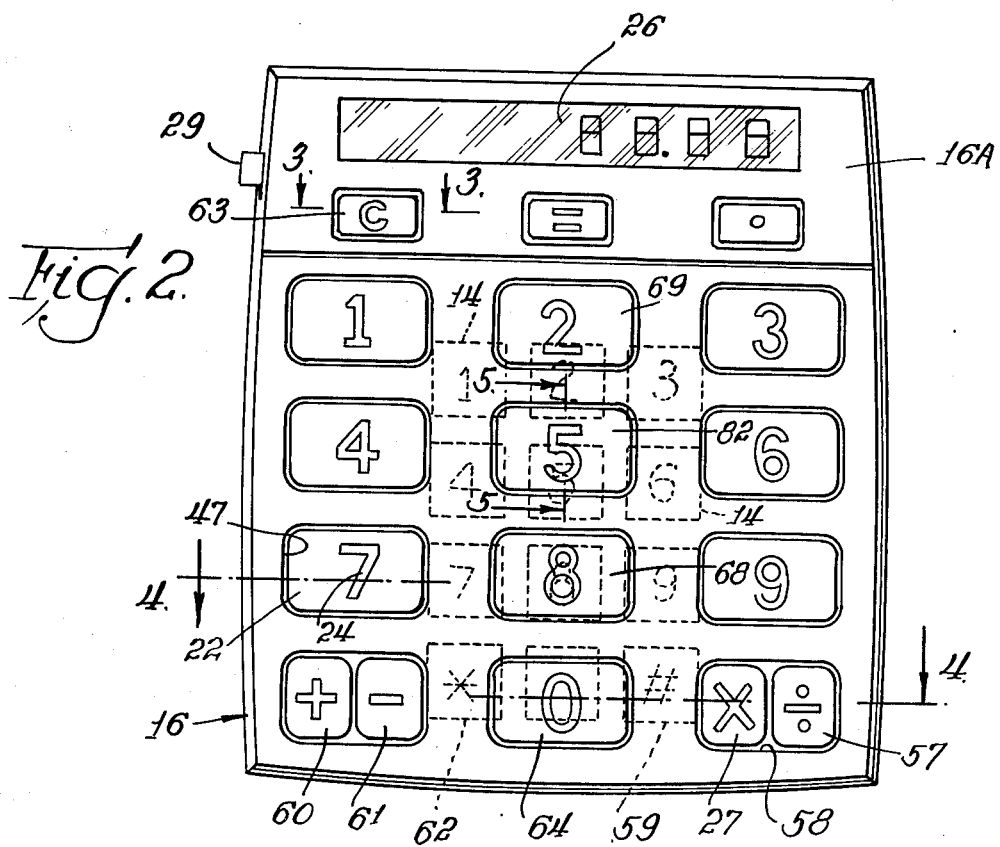
FIG. 2 is an enlarged top plan view of the calculator of FIG. 1.

Referring now to the drawings, and more particularly to FIG. 1 thereof, there is shown a calculator 10, which is constructed in accordance with the principles of the present invention, and which is mounted on a telephone 12 having an array of push buttons 14 (shown in broken lines in FIG. 2). The attachment 10 generally comprises a cup-shaped housing 16 having an array of finger discs generally indicated at 18 projecting from a face plate 20 of the housing 16. The array of finger discs 18 are slidably mounted on the housing 16 and are adapted to actuate corresponding ones of the array 14 of the push buttons for the telephone 12. The finger discs of the array 18 are arranged in rows and columns, and the discs in a given row are arranged further apart than the telephone push buttons of the array 14 to generally facilitate accurate manipulation of the array of push buttons 18, whereby the chances of actuating wrong telephone push buttons of the array 14 is greatly reduced. Moreover, the finger discs of the array 18 are somewhat larger in size than the corresponding telephone push buttons of the array 14 so as to facilitate greatly the actuation of the corresponding array of telephone push buttons. As best seen in FIG. 2 of the drawings, the finger discs, such as the disc 22, bear on their front faces large numerical indicia, such as the numerical indicia indicated at 24 on the front face of the finger disc 22, whereby the user can more readily and conveniently see the numerical indicia on the array 18 as compared to the numerical indicia normally found on the front face of the telephone push buttons.

In accordance with the present invention, there is provided as best seen in FIG. 6 of the drawings, logic circuits generally indicated at 25 for performing mathematical calculations, such as arithmetic functions commonly performed by calculators, and as best seen in FIGS. 1 and 2 of the drawings, a display device 26 for providing a digital read out of information concerning the calculations performed by the logic circuits 25. A second set of smaller discs, such as the disc 27 as best seen in FIG. 2, also project from the face plate 20 of the housing 18 for generating input signals to the logic circuits for providing function information, such as a multiplication indication to the logic circuits 25 as hereinafter described in greater detail. A set of switches, such as the switch generally indicated at 28 actuated by the disc 22 for actuating a telephone push button as best seen in FIG. 4, are employed to generate digital calculating information to the logic circuits 25. An on-off power switch 29 is also activated by the user to control the operation of the logic circuits 25.

As best seen in FIG. 4 of the drawings, a series of links or legs, such as the leg 30, interconnect the finger discs with corresponding ones of the telephone push buttons, such as the interconnection by the leg 30 between the finger disc 22 and the corresponding telephone push button 31. Some of the legs, such as the leg 30, include a transversely extending offset portion 32 to enable the finger disc to be spaced further apart in a row as compared to the telephone push buttons. The calculator 10 includes only three different kinds of legs, such as the leg 30 of FIG. 4, the leg 33 of FIG. 5 having a relatively shorter transversely extending offset portion 35, and a leg 37 of FIG. 4 having no intermediate offset portion. As a result, with only three different kinds of legs, if it is desired to mold the calculator 10 of plastic material, the mold would be simplified and the inventory and storage considerations for the parts are greatly simplified as compared to having a different leg for each different finger disc. Thus, the legs extending to the telephone push buttons enable the discs to move the telephone push buttons downwardly, and the springs (not shown) associated with each telephone push buttons returns the telephone push button and the finger disc to its initial position.

The smaller discs, such as the disc 27, employ their own return springs, such as the return spring 38 as shown in FIG. 4 of the drawings, as hereinafter described in greater detail.

Considering now the calculator 10 in greater detail with reference to the drawings, the housing 16 as shown in FIG. 4 includes an opened mouth 39 for fitting over the array 14 of telephone push buttons, and a series of pressure-sensitive adhesive pads 41 extend along two sides of the corner portions of the rim 43 on the back side of the housing 16 and a series of four 45 degree finger portions 44 which have a bottom surface in the same plane as the plane of the bottom edge of the rim 16. As a result, the housing 16 can be secured to the inclined face 45 (FIG. 1) of the telephone 12. A series or array of apertures, such as the aperture 47 of FIG. 4, extend through the plate or wall 20 of the housing 16 to mount slidably the legs therewithin.

Since each one of the apertures or holes of the array 18 is generally similar to one another, only the aperture 47 will now be described in greater detail. The aperture 47 includes an enlarged forward portion 49 in the upper surface of the plate 24 receiving its finger disc 22, and a reduced diameter portion 52 defined by a tube 53 centrally disposed relative to the aperture portion 49 extending transversely thereto for receiving reciprocatively the forward portion 54 of its leg 30, the reduced diameter portion 52 opening at its rear end into a chamber 56 which receives the array 14 of telephone push buttons, such as the button 31. In order to prevent the leg 30 from rotating axially, the disc 22 is not circular in cross section and the cross-sectional shape of the enlarged portion 49 of the aperture 47 is complementary-shaped relative to the shape of the disc 22. In this regard, as best seen in FIG. 2 of the drawings, the finger discs and their apertures receiving them are both rectangular in shape with rounded corners to prevent axial rotation of the legs. In this regard, it should be understood that the foregoing mentioning of the shape of the finger discs and their apertures relate to the finger discs bearing the indicia, such as the indicia 24, corresponding to the digital information on the telephone push buttons. Similarly, the smaller discs, such as the disc 27, are generally rectangular in shape with rounded corners, but they are smaller in size than the corresponding digital larger discs as hereinafter described in greater detail. While a rectangular shape is shown and described herein, it is to be understood that other non-circular shapes may also be employed, such shapes as square, diamond, oval, and others. It should be understood further that if a circular shape is desired, crowns (not shown) of circular cross-sectional shapes may be employed in any convenient manner over the portions of the discs normally extending above the upper surface of the plate 20. As shown in FIG. 2, the numerical or digital finger discs, such as the disc 22 are arranged in a series of rows and columns in a manner which is similar in arrangement to the corresponding array 14 of telephone push buttons, only ten of the twelve telephone push buttons are actuated by the calculator 10, it being understood that a greater or fewer number of finger discs may be employed on the calculator 10 to actuate a greater or fewer number of telephone push buttons if desired.

The smaller discs, such as the disc 27, serve only in connection with the calculating functions of the logic circuits 25. The smaller disc 27 and a similar smaller disc 57 serve as function generating devices for the multiplication and division, respectively, functions. An aperture 58, the upper portion of which is similar to the aperture 47, in the plate 20 receives both of the smaller discs 27 and 57 in a side-by-side arrangement. The discs 27 and 57 are disposed in close proximity to the pound sign telephone push button 59 shown in broken lines in FIG. 2 and in solid lines in FIG. 4 of the drawings. Another smaller function disc 60 for the addition operations and a smaller disc 61 for subtraction operations are disposed in a similar manner as the smaller discs 27 and 57 near the asterisk telephone push button shown in broken lines at 62 in FIG. 2 of the drawings. Additional calculating discs, such as the "CLEAR" disc 63, are provided on the upper base of a raised housing portion 16A as shown in FIG. 2 near the display device 26. The raised housing portion 16A is disposed between the array of telephone push buttons 14 and the telephone cradle 12A for the telephone hand set 12B, the upper face of the raised housing portion 16A being disposed above the plane of the plate 20 for more convenient reading of the display device 26.

Considering now the legs or links in greater detail, there are six legs connected to the two outer columns of three larger finger discs, such as the disc 22, with each one of the six legs being substantially identical to one another. The leg 37 for the finger disc 64 corresponding to the "O" telephone push button 65 (FIG. 4) is not provided with any lateral offset. Similarly, a leg 67 connected to the larger finger disc 68 associated with the numeral "8" telephone push button is similar to the leg 37 in that it also does not have any lateral offset so that it engages the telephone push button directly below it. The leg 33 generally is similar to a leg 68 connected to the underside of the larger disc 69 corresponding to the telephone push button bearing the numeral "2", and as best seen in FIG. 4 of the drawings, generally comprises the forward portion 54 axially aligned with the enlarged portion 49 of the aperture 47 and the reduced portion 52 defined by the tube 53 and press fitted into an opening in the back side of the finger disc 22 in a boss 71 for fixedly connecting the finger disc 22 to the forward end of the portion 54 of the leg 30. The laterally offset intermediate portion 32 extends at right angles to the forward portion 54 and terminates in a foot portion 73 being displaced laterally from the front portion 54 by a substantial distance to enable the finger disc 22 to be spaced further apart from the adjacent finger disc 68.

In order to facilitate the manipulation of the finger discs, each one of them, such as the finger disc 22 of FIG. 4, includes an upper recess 74 as indicated in broken lines to enable the finger of the user to engage securely the finger disc while depressing it. When the user presses the finger discs downwardly, the legs attached thereto also move downwardly to depress the selected telephone push buttons. The return springs (not shown) for the telephone push buttons cause the legs of the calculator 10 to return to their initial positions as shown in FIG. 4 so that no return springs are needed for the larger finger discs.

The calculator 10 is preferably composed of plastic material. In order to facilitate the assembly of the attachment 10 as shown in FIGS. 4, 5 and 6 of the drawings, a plurality of orienting slots or grooves, such as the groove 74 in the tube 53 for the leg 30 of FIG. 4 of the drawings, are disposed in the back side of the plate 20 opening into the chamber 56 for receiving the intermediate portions of the legs, whereby when the attachment 10 is being assembled, the legs with the discs removed are inserted into the apertures with the intermediate portions aligned with and positioned within the orientation grooves so that when the discs are later snapped onto the forward end portion of the legs to thereafter prevent any axial rotation thereof, the legs are then in the proper position to mate with the corresponding ones of the telephone push buttons. In order to further facilitate the orientation of the legs and also in order to help locate the telephone push buttons relative to the legs during installation of the calculator 10 onto the telephone 12, as . shown in FIGS. 4 and 6 of the drawings, a U-shaped locating frame 76 depends from the upper plate 20 to closely surround the array 14 of telephone push buttons. As shown in FIG. 6 of the drawings, the frame 76 generally comprises a cross member 76A having a pair of leg portions 76B and 76C extending at right angles to the ends of the member 76A, the free end portions of the legs 76B and 76C each having respective inturned right angle distal end portions 76D and 76E. For locating the legs of the larger discs, the leg portions 76B and 76C of the frame 76 each includes a series of three elongated slots or slits, such as the slot 77 for the leg 30 in the leg portion 76C of the frame 76. A slot 78 in the intermediate portion of the cross member 76A accommodates the leg 79 associated with the disc 69. In this regard, the two outer columns of larger disc legs and the leg 79 extend through slots in the tubes and in the locating frame to insure that the legs are properly aligned relative to their corresponding push buttons when the calculator 10 is assembled to the telephone 12.

The pair of legs 33 and 79 of the middle column of larger finger discs have shorter intermediate leg portions. Since the legs 33 and 79 are similar to one another, it will only be necessary to describe the leg 33. As shown in FIG. 5, the leg 33 includes a forward portion 80 having a finger disc 82 press fitted onto its forward end in a similar manner as the finger disc 22 on the leg 30, and the intermediate offset portion 35 integrally connects the forward portion 80 to a foot portion 84, which terminates in an integrally connected enlarged distal end portion 86. The intermediate portion 35 is somewhat shorter in length than the longer intermediate portions, such as the intermediate portion 32 of the leg 30, due to the orientation of the finger discs relative to the corresponding telephone push buttons.

As shown in FIG. 4, the leg 37 for the finger disc 64 includes a single axially-extending rod 88 integrally connecting the finger disc 64 at its forward end and an enlarged distal end portion 93 at its rear end for actuating its corresponding telephone push button 65 since there is no need for a lateral offset due to the positioning of the telephone push buttons relative to the finger discs. Thus, there are only three different kinds of legs employed by the calculator 10, and hence the mold for manufacturing the plastic calculator housing 16 and the legs is simplified and the inventory control for the various different parts is greatly simplified.

Except for the finger disc 67 of the central column of larger finger discs, the other three larger finger discs are associated with tubes, such as the tube 94 for the finger disc 64, which are shorter in length than the other tubes, such as the tube 53, since there is no need to have an orientation slot such as the slot 75 in the tube 53.

In order to assemble the legs to the housing 16 of the calculator 10, the legs with the finger discs removed are inserted with their forward ends through the chamber 56 into the apertures and rotated until the intermediate portions thereof are aligned with the orientation grooves in the tubes and the slots in the locating frame 76. Thereafter, a flat plate (not shown) or other similar fixture may be used to press the enlarged distal end portions of the legs toward the plate 30 for maintaining the intermediate portions of the legs in their orientation grooves and slots, whereby the finger discs may then be inserted into the enlarged portions of the apertures for snapping the finger discs into engagement with the forward ends of the legs to complete the assembly operation. Thus, the legs are then trapped within the apertures since the finger discs and the enlarged distal end portions are larger in diameter than the diameter of the tubes. Also, as mentioned before, the shape of the discs and the complementary shape of their elongated portions of the apertures prevent axial rotation of the legs. As a result, the housing 16 can be readily secured in place on the telephone 12 with the enlarged distal end portions of the legs in proper position in engagement with the telephone push buttons.

Considering now the switches associated with the finger discs, the larger finger discs, such as the finger disc 82, are all similar to one another, therefore only the switch associated with the disc 82 will now be described in greater detail. An electrical switch 97 responds to the downward movement of the leg 33 when the finger disc 82 is depressed for electrically connecting a pair of lead wires 99 and 101, which are connected electrically to the logic circuits 25. As best seen in FIG. 5 of the drawings, the electrical switch 97 includes an electrical contact 103 which is in the form of an electrically conductive film or tape material wrapped about the intermediate portion 35 of the leg 33, the contact 103 being electrically connected to the lead 99. Disposed below the electrical contact 103 is another electrical contact 105 which is in the form of a spring contact extending under the intermediate portion 35 directly opposite the electrical contact 103, the contact 105 being connected to a tube 106 defining the reduced diameter portion of the aperture 107 for the disc 82. The only difference between the switches for the discs 82, 68 and 64 and the other number bearing larger discs is that the other discs on the outside of the locating frame 76 have their spring contacts connected to the locating frame 76.

Considering now the switches associated with the smaller discs, the four function discs 27, 57, 60 and 61 are similar to the three other calculating discs, such as the disc 63, and therefore only the switches for the disc 63 will now be described. The disc 63 is generally cup-shaped and fits telescopically over a lower cup-shaped base member 111. A spring 113 within the base member 111 biases the disc 63 in an upper raised position as shown in FIG. 3 of the drawings. An electrical contact 115 is mounted on and carried by the disc 63 at its lower rim to engage electrically with a contact 117 mounted on the outside of the base 111 directly below the electrical contact 115. A pair of electrical leads 119 and 120 are connected to the respective electrical contacts 115 and 117 for providing an electrical signal to the logic circuits 25. The base 111 fits in a depressed portion 122 of the upper face 124 of the raised portion 16A of the housing 16, and a hole 124 in the depressed portion receives the lead wires 119 and 120 to enable them to be connected to the logic circuits 25.

Considering now the logic circuit 25 in greater detail with reference to FIG. 6 of the drawings, an 8-digit 4-function, floating decimal point integrated circuit calculator chip 126 and a display driver integrated circuit chip 128 are mounted on a printed circuit board 131 within the raised portion 16A of the housing 16 for providing the necessary calculator functions. A battery 133 is also mounted within the raised portion 16A of the housing 16 for electrically energizing the logic circuits 25 and the display device 26. The electrical energy is supplied to the circuits under the control of the on-off switch 29 which controls the making and breaking of a pair of electrical contacts 137 and 139 within the raised portion 16A of the housing 16.

The manner in which the logic circuits 25 operate and the manner in which they are connected are fully and completely described in a certain publication dated October, 1974 by National Semiconductor Corporation of Santa Clara, California. The calculator chip 126 may be a National Semiconductor chip identified as MM5737, the display driver integrated circuit chip 128 may be a National Semiconductor chip identified as DM8864, and the display device may be a National Semiconductor device identified as NSA198. The battery 133 is a 9 volt battery. The aforementioned publication dated October of 1974 may be obtained from National Semiconductor Corporation, 2900 Semiconductor Drive, Santa Clara, California 95051. The publication is entitled, "MM 5737 calculator-8-digit, 4-function, floating decimal point".

It should now be understood from the foregoing description that the calculator 10 of the present invention is adapted to be mounted on a conventional push button telephone and serves two different functions with the same device. In this regard, the calculator 10 serves as an enlarger for the push buttons on the telephone so that it becomes more convenient to use and to see. The calculator 10, when the switch 29 is moved to the on position, serves as a calculator, and the same finger discs which are used for depressing the telephone push buttons may be used to generate information signals for the calculating logic circuits of the calculator. Thus, while someone is in the process of having a telephone conversation, calculations can be made with the calculator 10 without interfering with the operation of the telephone. Also, the calculator 10 may be used for performing mathematical calculations when the telephone is not in use. Similarly, it should also be understood that the finger discs of the calculator 10 may be used for initiating telephone calls without affecting the calculating logic circuits by having the switch 29 in its off position.

While the present invention has been described in connection with a particular embodiment thereof, it will be understood that many changes and modifications of this invention may be made by those skilled in the art without departing from the true spirit and scope thereof. For example, it will become apparent to those skilled in the art that additional smaller finger discs and associated switches may be employed when a larger number of functions are to be employed in connection with the logic circuits. Accordingly, the appended claims are intended to cover all such changes and modifications as fall within the true spirit and scope of the present invention.

What is claimed is:

1. A calculator adapted to be used with a push button telephone having an array of telephone push buttons, said calculator comprising:
    a cup-shaped housing having an opened mouth adapted to fit over the array of push buttons of the telephone and to be secured in place thereover, said housing having a plate, said plate including an array of apertures extending therethrough, said plate having inner and outer faces;
    a first array of finger discs corresponding to at least some of the telephone push buttons for actuating them and bearing indicia on the front faces of said discs, said discs normally at least partially extending outwardly from the outer face of said plate, said discs having rear faces on the opposite side of said front faces;
    a series of elongated legs fixedly connected to said rear faces and slidably extending through said apertures to the telephone push buttons for actuating them selectively when depressed and alternatively maintaining said discs normally at least partially extending outwardly from the outer face of said plate, at least one of said legs having an axially-extending front portion disposed in axial alignment with its aperture in said plate and having a laterally extending intermediate portion connected at its forward end to said front portion and terminating in a foot portion adapted to engage one of the telephone push buttons;
    logic circuit means mounted within said housing for performing mathematical calculations;
    display means mounted on said housing and responsive to said logic circuit means for indicating information concerning said calculations;
    first switching means mounted on said housing and responsive to said finger discs for causing the generation of input information for said logic circuit means;
    a second array of finger discs bearing calculating indicia on the front faces thereof; and
    second switching means mounted on said housing and responsive to said second array of finger discs for causing additional input information to be generated for said logic circuit means.

2. A calculator according to claim 1, wherein each one of said apertures in said plate includes an enlarged portion for receiving its finger disc and a reduced diameter portion for reciprocatively receiving the forward portion of its leg, the intermediate and foot portions of said legs being disposed in back of said plate.

3. A calculator according to claim 2, wherein the cross-sectional shape of said enlarged portions of said apertures are complementary-shaped relative to the cross-sectional shape of said discs, the complementary cross-sectional shapes of said enlarged portions and said discs causing said discs and said legs fixed thereto to resist axial rotation thereof.

4. A calculator according to claim 3, wherein the rear face of said plate includes means defining a plurality of orientation grooves for each one of said legs having intermediate offset portions to receive them when said discs are withdrawn partially from their enlarged portions of their apertures.

5. A calculator according to claim 3, wherein one of said legs includes longer intermediate portions and shorter laterally offset intermediate portions, further including at least one leg having an axially-extending front portion aligned with its aperture and terminating in its enlarged distal end portion disposed in axial alignment with its front portion.

6. A calculator according to claim 1, further including a U-shaped locating frame depending from the underside of the housing to fit over and at least partially surround the telephone push buttons for facilitating the attaching of the calculator to the telephone.

7. A calculator according to claim 6 wherein said frame includes a series of slots for receiving the legs to orient them properly relative to the push buttons.

8. A calculator according to claim 1, wherein at least some of said apertures in said plate terminate in a reduced diameter central opening defined by a tube.

9. A calculator according to claim 8, wherein said tubes include orienting grooves for said legs.

10. A calculator according to claim 1, wherein said logic circuits include a calculator integrated circuit chip and a display driver integrated circuit chip, said calculator further including a display device which responds to said logic circuits.

* * * * *